March 19, 1940. W. BREDTSCHNEIDER 2,193,795
STEAM GENERATOR
Filed April 30, 1937
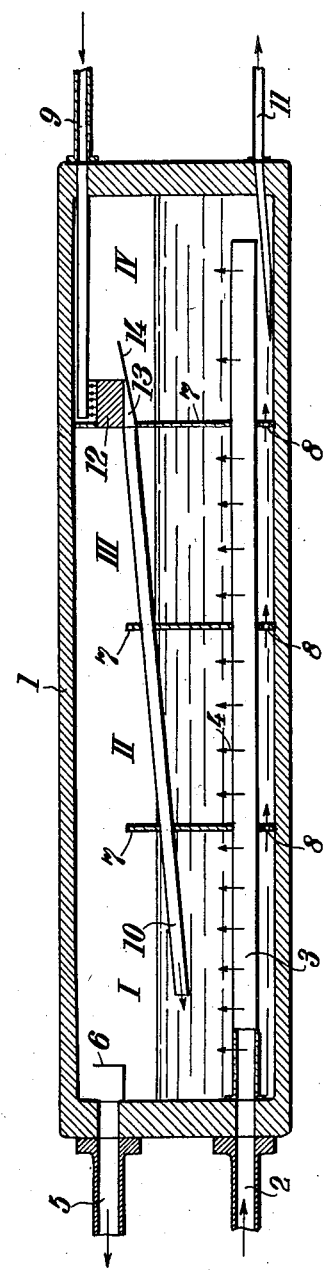
Inventor:
W. Bredtschneider
By: Glascock Downing Seebold Patented Mar. 19, 1940

2,193,795

UNITED STATES PATENT OFFICE 2,193,795

STEAM GENERATOR

Walter Bredtschneider, Berlin-Charlottenburg, Germany

Application April 30, 1937, Serial No. 140,054
In Germany April 16, 1936

11 Claims. (Cl. 122—31)

This invention relates to a high-output drum steam generator, in which the feeding is effected into the boiler drum, and its object is to improve the purity of the steam generated. In high-power steam plant, particularly when the pressure is high, the questions of the purity of the feed, the concentration of the salts dissolved therein, and the purity of the steam generated, are of very great importance: for the majority of the systems in use for generating high outputs of steam are exceedingly sensitive to the presence of salts in the feed water. Even comparatively small quantities of impurities in the steam may lead to disturbances in operating turbines. Hence in the steam generators only a comparatively low concentration of salts dissolved in the feed water can be permitted, the allowable concentration varying according to the type of generation of steam adopted. The removal of sludge from the steam generators necessitated hereby results however in losses of heat, which seriously impair the economy of operation, particularly in the case of plant for which only chemically prepared feed water is available. In order that successful operation of the boiler may be obtained even though there is a relatively high concentration of impurities in the boiler water, washing devices and baffle plates have been adopted in the boiler drums. Apart from the fact that these devices cannot eliminate the difficulties occasioned by the impurities in the boiler water on the evaporating heating surfaces, the action thereof can only be incomplete, since they are only able to deal with the phenomena consequent upon a high concentration of salts in the water.

The present invention however solves this problem in a manner which renders it possible, notwithstanding small removal of sludge from the steam generators, to generate the steam predominantly from water having a low concentration of dissolved salts. According to the invention this result is attained by sub-dividing the water space of the boiler into a plurality of compartments, which communicate with one another preferably near their lowest point, and which work separately in parallel with one another as regards the generating of steam but are connected in series with one another as regards feeding, and are so designed that the major portion of the total output of steam is generated in the compartments that are fed first. The aggregate quantity of feed water supplied to the steam generator is fed into the first compartment, the other compartments each being fed from the one that precedes it, and each compartment being freed from sludge, by the feeding of the succeeding compartments, to the extent of the quantity of water evaporated in all the compartments that follow it. The removal of boiler water from the steam generator for the purpose of freeing it from sludge is then effected from the last compartment.

The generating of steam in the individual compartments is thereby effected with a great and progressive increase in the concentration of salts in the water. In the first compartment the concentration adjusts itself to a value only a little higher than that of the fresh feed water. From one compartment to the next it increases slowly at first, and only in the last compartment is a very high concentration yielded. This last compartment may then be specially adapted to operating with water of very high concentration.

A particularly advantageous employment of the steam from the last compartment is further provided according to the invention by supplying the feed water to the boiler drums at a temperature lower than the saturation temperature, and effecting this residual pre-heating of the feed water, before it enters the first compartment, by means of steam from the last compartment. This steam is then partially condensed, and the condensate accruing is likewise fed into the first compartment. The residual steam from the last compartment is then at the same time washed by the fresh feed water.

One embodiment of the invention, as applied to a Löffler boiler, is illustrated by way of example in the accompanying drawing, in which 1 denotes the boiler drum of the Löffler boiler, to which hot steam serving as a heat-carrier is supplied through a pipe 2. The hot steam is then blown into the water space of the boiler drum 1 through a tube 3 and through nozzles indicated by means of arrows 4. The saturated steam generated is taken away, at the same end of the boiler drum as that at which the hot steam is supplied, through a pipe 5 over a weir 6. The interior of the boiler drum is divided by vertical partitions 7 into compartments, four for example, marked I, II, III and IV. In the steam space these partitions 7 leave large cross-sectional areas open through which the compartments communicate with one another, so that as regards the generating of steam they work in parallel with one another. In the water space the partitions 7 have small holes 8 near the bottom of the boiler drum 1, for the passage of the water from one compartment to the next. The whole of the feed water is supplied through the pipes 9 and a tube 10 to the compartment I, so that as regards feeding the compartments are connected in series with one another. The removal of sludge from the boiler drum 1 is effected from the compartment IV through a pipe 11.

The individual compartments, as regards their output of steam, are differently dimensioned according to the concentration of dissolved salts in the water therein, as indicated by the different numbers of hot steam injection nozzles 4. In the compartment IV, in particular, in which the concentration is very much higher than in the other compartments, the water-level loading and steam-space loading are also much less than in the other compartments.

The predominant portion of the steam is in this way generated from water of very low concentration and, therefore, is of great purity from the outset. In order to improve the purity of the total quantity of steam generated still further, the steam generated in compartment IV is washed, before joining the steam from the other compartments, by the fresh feed water. For this purpose there is provided between the compartments III and IV, at the junction point in the steam space, a basket 12, which is filled with Raschig rings or the like, and which is sprinkled by the fresh feed water from the pipe 9. At the bottom of the basket 12 the water is caught in a funnel 13, and is supplied by the tube 10 to compartment I. The admission side of the basket 12 is here also screened from the surface of the water in compartment IV by a plate 14.

Since the feed water of the boiler drum 1 is in general supplied at a temperature lower than the saturated steam temperature, the steam from the compartment IV is partially condensed in the basket 12. The condensate is supplied to compartment I together with the feed water. It is most advantageous so to adjust the preheating of the feed water before it enters the boiler drum 1, and the output of steam in the compartment IV, that the steam generated in the compartment IV, during the further preheating of the feed water to saturation temperature, is completely condensed. In Löffler boilers there is then the special advantage that, by maintaining a lower preheating of the feed water, the circulating pump ratio is increased, and a saving of power for the circulating of the steam is thereby effected.

When the invention is applied to steam generators of other types, other possibilities arise in carrying it out, according to the nature of the type in question. Thus the last compartment may, for example, be provided with a separate furnace. In boilers in which the steam generated is used, before being utilised in engines, as a heat carrier for generating steam in the boiler itself, this indirect generating of steam may be located more particularly in the last compartment, in which case a direct heating may be entirely dispensed with.

What I claim is:

1. In a high duty steam generator particularly for high pressure, a boiler having a steam and a water space, means for introducing the feedwater in said water-space, a plurality of steam generating compartments within said boiler having a water and a steam space and jointly constituting the water and steam space of the steam generator, means for introducing the feed-water into but one of said compartments, means for introducing the feed-water into the other compartments from the foregoing compartment, the compartment last fed being designed to generate only the smaller part of the total amount of the steam, and means for condensing the steam from the last fed compartment by the feed-water previous to the entry of said feed-water into the first fed compartment, and means for blowing off the boiler from the last fed compartment.

2. In a steam generator, a boiler, at least one partition in said boiler providing a first and a second compartment, means for blowing off the boiler from the second compartment, said partition having an opening therein for permitting water to pass from the first compartment to the second compartment, means for generating more steam in the first compartment than in the second compartment, means associated with the feed water means for condensing steam generated in the second compartment, and means arranged to convey the feed water together with the condensed steam to the first compartment.

3. In a steam generator, a boiler, at least one partition arranged for dividing the boiler into two compartments with the first compartment larger than the second, means for blowing off the boiler from the second compartment, means for introducing feed water into the first compartment, the last said means consisting of a tube extending from the second compartment to the first compartment, an opening in said partition for admitting water to the second compartment from the first compartment, means for vaporizing the water in said compartments, means for condensing steam generated in the second compartment, means for supplying feed water for the generator to said condensing means and means for introducing the feed water and the condensed steam into said tube.

4. In a steam generator, a boiler, a plurality of partitions extending upwardly from the bottom of the boiler so as to divide the lower portion thereof into a number of compartments, a tube extending into the compartment at one end of the boiler for introducing feed water thereto, said partitions each having an opening therein so located that water from the compartment first fed may pass successively to the other compartments, means for blowing down the boiler from the compartment last fed with water, means for generating steam in all of the compartments, a feed water pipe terminating in the compartment last fed with water, means for segregating from the other water in the last mentioned compartment the water issuing from said pipe and introducing the same into said tube, and means for causing the steam generated in the compartment last fed with water to pass through the water issuing from said pipe when moving the water towards the first compartments.

5. In a steam generator, a boiler having a steam space and a water space, means for supplying feed water to said boiler drum and for introducing the same into the water space, means for blowing off the boiler, means for heating the water in the boiler drum, said blow-off means being functionally remote from the inlet of the feed water into the water space, means for compelling flow of water from that location in the boiler to which feed water is introduced to that location from which the boiler is blown off and for preventing flow in the opposite direction, means associated with the feed water means for condensing steam generated in the blow-off section, said feed water supply means being arranged to convey the condensed steam together with the feed water to the feed water inlet.

6. In a steam generator as claimed in claim 5, the condensing means being arranged in the steam space of the boiler.

7. In a steam generator as claimed in claim 5, the condensing device being located to operate by direct contact of the steam with the feed water.

8. In a steam generator as claimed in claim 5, a partition keeping the steam generated in the blow-off section of the boiler drum is separated from the other steam generated.

9. In a steam generator, a boiler having a steam space and a water space, means for supplying feed water to said boiler drum and for introducing the same into the water space near the one face of said boiler, means for heating the water in the boiler drum, means for blowing-off the boiler near the other face of the same, the water introducing section and the blowing-off section formed thereby being functionally remote, means for compelling flow of water from that location in the boiler to which feed water is introduced to that location from which the boiler is blown off and for preventing flow in the opposite direction, means associated with the feed water for condensing steam generated in the blow-off section, said feed water supply means being arranged to convey the condensed steam to the feed water introducing section.

10. In a steam generator a boiler having a steam space and a water space, means for supplying feed water to said boiler drum and for introducing the same into the water space, main steam offtake means, means for heating the water in the boiler drum, means for blowing-off the boiler, said blow-off means being functionally remote from the inlet of the feed water into the water space, means for compelling flow of water from that location in the boiler to which feed water is introduced to that location from which the boiler is blown off and for preventing flow in the opposite direction, means associated with the feed water means for condensing steam, said means being connected with the blow-off section of the boiler and separated from the main steam offtake means, offtake means for the steam generated in the blow-off section, said means being separated from said main steam offtake means, said feed water supply means being arranged to convey the condensed steam together with the feed water to the feed water inlet.

11. In a steam generator, a boiler having a steam space and a water space, means for supplying feed water to said boiler drum and for introducing the same into the water space, means for blowing-off the boiler, means for heating the water in the boiler drum, said blow-off means being functionally remote from the inlet of the feed water into the water space, means associated with the feed water means for condensing steam generated in the section of the blow-off water offtake, said feed water supply means being arranged to convey the condensed steam together with the feed water to the feed water inlet, a partition separating the steam space of the blow-off section from the other steam space of the boiler drums, an opening in said partition, said steam condensing means being arranged in said opening, being operated by direct contact of the steam with the feed water and forming a passage for the uncondensed steam from the steam space of the blow-off section to the other steam space of the boiler drum.

WALTER BREDTSCHNEIDER.